United States Patent Office 3,190,366
Patented June 22, 1965

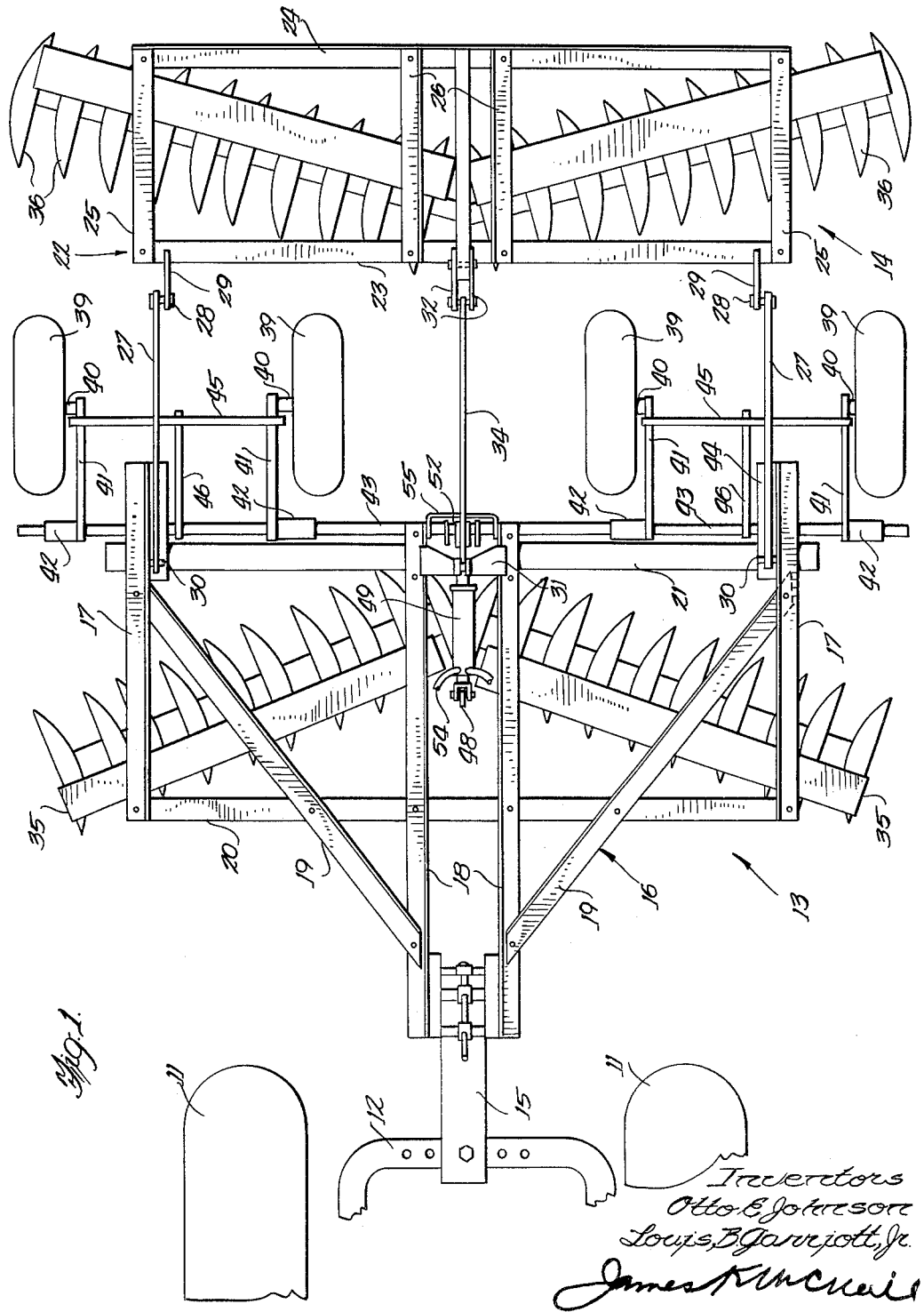

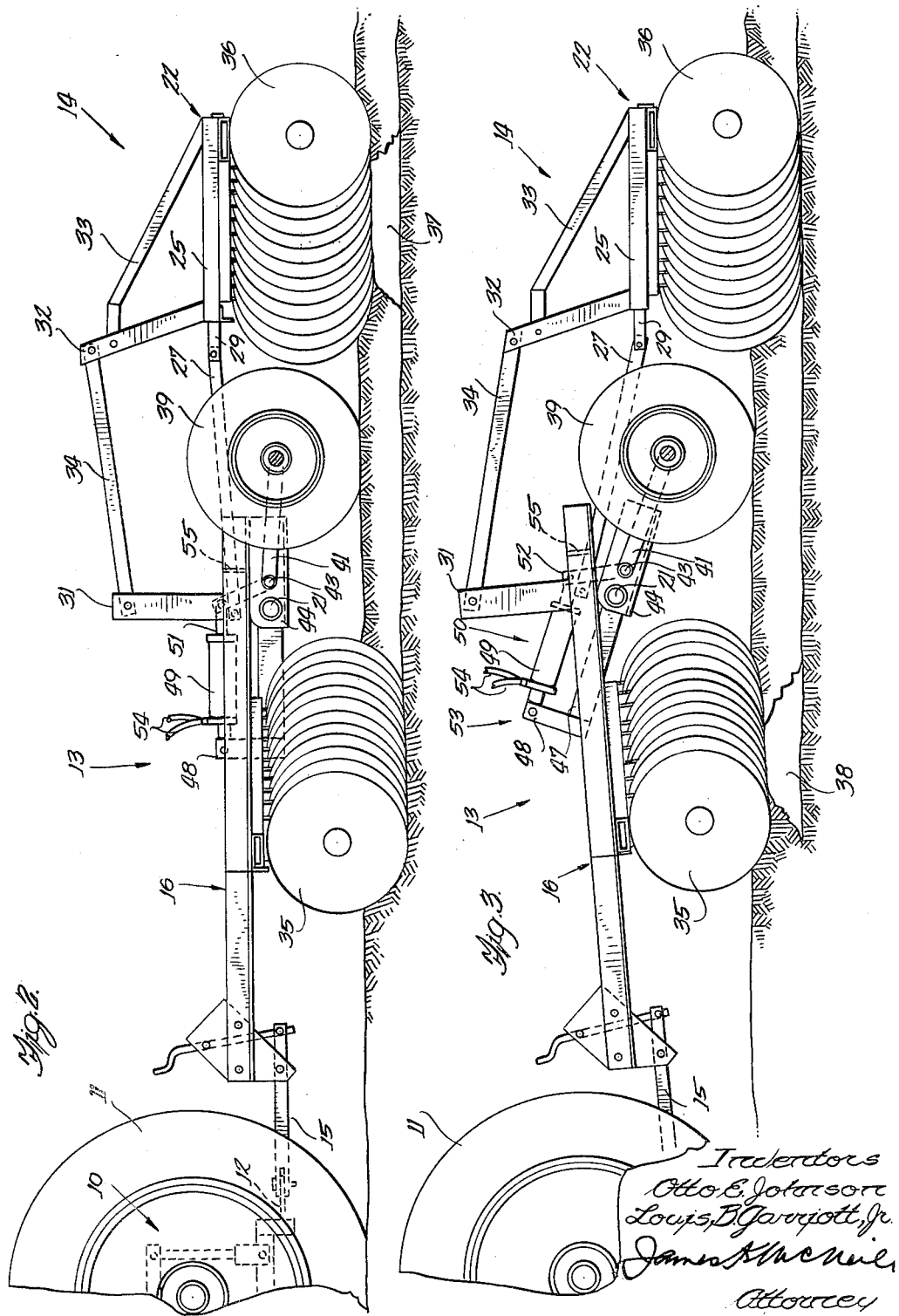

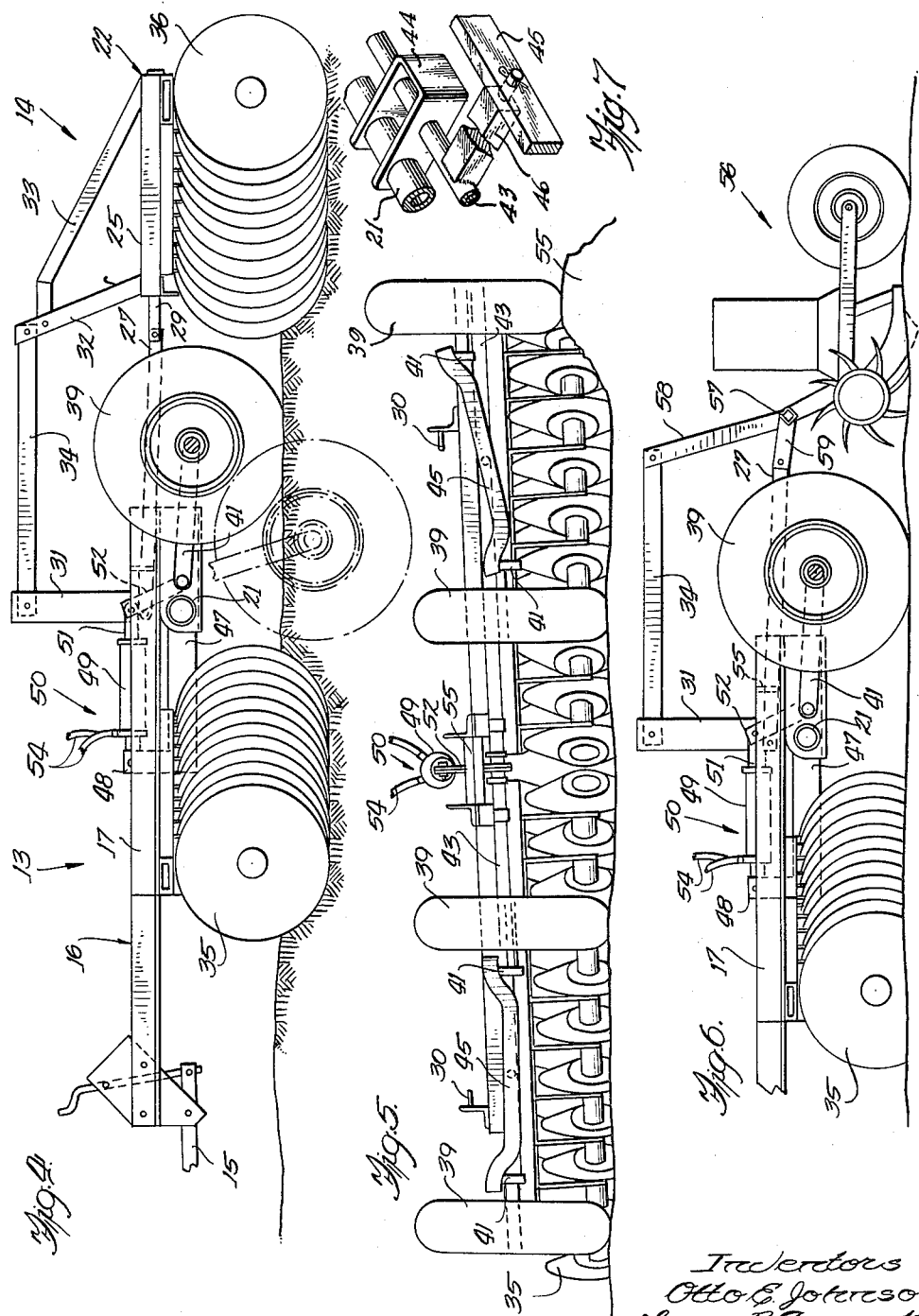

3,190,366
AGRICULTURAL IMPLEMENT
Otto E. Johnson, Hinsdale, and Louis B. Garriott, Jr., Westmont, Ill., assignors to International Harvester Company, Chicago, Ill., a corporation of New Jersey
Filed Feb. 5, 1963, Ser. No. 256,366
9 Claims. (Cl. 172—413)

This invention relates to agricultural implements, particularly of the trailing type. More specifically, the invention concerns an implement adapted to be raised on supporting wheels for transport.

An object of the invention is the provision of an implement of improved flexibility.

Another object of the invention is the provision of a novel implement having tandem operating units, wherein maximum relative vertical movement between the units is achieved to accommodate the units to variations in ground contour with minimum stress upon the implement parts.

Another object of the invention is the provision of a novel implement having tandem operating units, wherein substitution of one unit for another is easily accomplished to provide different agricultural operations in a unitary machine.

A further object of the invention is the provision of an improved agricultural implement of the wheel supported tandem type wherein maximum flexibility is provided in a single machine between units adapted to perform simultaneously different agricultural functions such as tillage and planting and the like in one field operation.

Other objects and advantages of the invention will become clear from the following detailed description when read in conjunction with the accompanying drawings, wherein:

FIGURE 1 is a plan view of a tandem disk harrow connected to a tractor and incorporating the features of this invention;

FIGURE 2 is a side elevation of the apparatus of FIGURE 1 showing the position of the parts when the rear unit of the harrow passes over an obstruction;

FIGURE 3 is a view similar to FIGURE 2 showing the position of the harrow parts when the front gang passes over an obstruction;

FIGURE 4 is a view similar to FIGURES 2 and 3 showing the normal operating position of the implement, and in dotted lines the transport position of the supporting wheels;

FIGURE 5 is a rear elevation of the front section or unit of the machine with the rear section removed, and demonstrating the flexibility of the supporting wheels, and illustrating the application of the equalizer bar;

FIGURE 6 is a view in side elevation of a compound tandem implement similar to that shown in FIGURE 4 wherein the rear section has been replaced by a planter unit; and FIGURE 7 is a detail in perspective of a portion of the apparatus of this invention.

The implement of this invention is shown attached to a tractor 10 having rear drive wheels 11 and a drawbar 12.

The implement shown in FIGURES 1 to 4 is a tandem, wheel-controlled disk harrow comprising front and rear units 13 and 14 and a hitch member 15 on the front unit adapted for pivotal connection to the tractor drawbar 12. The supporting frame for the front unit, designated by the numeral 16, is generally rectangular and includes side bars 17, forwardly projecting center bars 18 and diagonal bars 19 connecting side bars 17 to the forward ends of bars 18. A forward transverse bar 20 is secured to the forward ends of side bars 17 and bars 18 and 19, and a transverse pipe member 21 extends between and is rockably supported by the rear portions of bars 17 and 18. The rear section 14 of the harrow comprises a rectangular supporting frame 22 including longitudinally spaced transverse frame bars 23 and 24 connected by side bars 25 and inner bars 26. Connecting means between the front and rear frames 16 and 22 comprises laterally spaced draft links 27 connected by pivot pins 28 with the ends of lugs 29 affixed to and projecting forwardly from the transverse rear frame bar 23. The forward ends of the lower draft links 27 are pivotally connected to pins 30 secured to side bar 17 of the front frame.

A pair of upright mast members 31 and 32 are provided, upright 31 comprising spaced parts being affixed to frame bars 18 and upright 32 comprising laterally spaced parts affixed to the transverse bar 23 of the rear frame. Upright 32 is further braced by a strap 33 connecting the upright 32 to rear frame bar 24. An upper link 34, triangularly disposed with respect to draft links 27 is generally parallel to links 27 and is pivotally connected to the upper ends of uprights 31 and 32.

Front and rear frames 16 and 22 have secured to the undersides thereof, respectively, pairs of angled disk gangs 35 and 36. By virtue of the novel parallel link connections consisting of the links 27 and 34 and uprights 31 and 32, the disk gang sections 13 and 14 are capable of relative vertical movement, as indicated in FIGURES 2 and 3, when an obstruction is encountered by either of the sections. In a conventional disk harrow, when the rear gang rises over an obstruction such as that indicated at 37 in FIGURE 2, the front gang also rises, and where the front gang rises over an obstruction such as indicated at 38 in FIGURE 3, the rear gang normally rises with it. However, by virtue of the parallel link connection described, only the gang engaging the obstruction rises. Furthermore, upper link 34 is a compression link reacting against the front section 13 through upright 31 in response to any force tending to tilt the rear section 14 forwardly.

The implement of this invention is a wheel controlled disk harrow wherein the relatively angled pairs of gangs 35 and 36 are mounted on the supporting frame in any well known manner and preferably by means accommodating adjusting the angle between the pairs of gangs. Laterally spaced pairs of wheels 39 are provided and each is rotatably mounted upon a stub shaft 40 secured to the rear end of an arm 41, the forward end of which is affixed to a sleeve 42 pivotally mounted upon transverse shaft 43 rockably mounted on the forward frame 16 with the outer ends projecting through the sides of a channel or U-shaped member 44, the forward end of which is affixed to the transverse tubular member 21.

An equalizer bar 45 extends between each pair of wheels 39 and its ends rest upon the wheel supporting arms 41. Each equalizer bar 45 is pivotally mounted upon the rear end of a bar 46, the forward end of which is affixed to the shaft 43. Channel 44 and transverse member 21 form part of an auxiliary frame which includes a generally horizontal beam 47, the rear end of which is affixed to member 21 and the forward end of which carries an upwardly projecting lug 48 to the upper end of which is pivotally connected the cylinder 49 of a hydraulic ram 50 having a piston rod 51 slidable therein and pivotally connected to the upper end of a rock arm 52 affixed to shaft 43. It may be understood that shaft 43 is split in the middle and that arm 52 comprises two members affixed to the inner ends of the parts of said shaft.

The auxiliary frame including the parts 21, 44 and 47 is generally designated by the numeral 53 and, as indicated in FIGURE 3, assumes a tilted position with respect to the front frame 16 when the latter rises relative to the rear frame, carrying the hydraulic ram unit 50 with it. The implement is raised to the transport position indicated by the dotted line showing of the wheels in FIGURE 4 by actuation of the ram to extend piston rod 51 with respect to the cylinder 49. Fluid under pressure is supplied to the cylinder 49 through hose lines 54 from a suitable source of fluid under pressure, not shown, on the tractor 10. Extension of the piston rod in the cylinder moves rock arm 52 to the right as viewed in FIGURES 2, 3, 4 and 6 causing equalizer bar 45 to exert pressure downwardly against wheel arms 41 to lower the wheels with respect to the implement frame. Action of the equalizer bars 45 in accommodating the implement to variations in ground contour is illustrated in FIGURE 5 wherein the right-hand wheel of the right-hand pair of wheels 39 is shown engaging an obstruction 55 causing the wheel to rise by virtue of the pivotal mounting of equalizer 45 on its supporting bar 46 relative to the other wheel of the pair as well as to the left-hand pair of wheels.

With the wheels 39 lowered and the front section 13 elevated above the ground, lower links 27 connecting rear section 14 to front section 13 engage the upper edge of the channel-shaped member 44 at a location rearwardly of the pivot pins 30 so that the rear section 14 is also held above the ground in transport position. Accidental over-swinging of the wheels 39 forwardly with respect to their pivot axis 43 is prevented by engagement of rock arm 52 with a stop 55 carried by the front frame.

Wheels 39 gauge the operating depth of front and rear sections in normal operation. The rear ends of side bar 17 contacts the upper edge of channel member 44 to limit operating depth of the front section. At the same time lower draft links 27 contact the upper edge of member 44 to limit the operating depth of the rear section. Actuation of ram 50 changes the vertical relationship of wheels 39 to member 44 to alter the operating depth of both front and rear sections.

Harrowing and plating are performed simultaneously by the machine shown in FIGURE 6. In this implement the entire front section of the harrow shown in FIGURES 1 to 5 including the upper and lower links 34 and 27 is utilized, the rear section 14 of the harrow being replaced by planting mechanism 56. In this instance the planter is shown and only one ground unit is illustrated, it being understood that the rear frame 22 is replaced by a transverse tool bar 57 upon which a number of ground units such as that shown are mounted at laterally spaced locations. An upright 58 affixed to tool bar 57 has its upper end pivotally connected to the rear end of upper link 34, and lugs 59 are secured to the tool bar and extend forwardly therefrom for pivotal connection to the rear ends of lower links 27. Thus, other types of implements may be substituted, if desired, for either of the sections of the implement shown in the drawings.

It is believed that the construction and operation of the novel flexible implement of this invention will be clearly understood from the foregoing description. It should likewise be understood that the invention has been described in its preferred embodiment and modifications may be made in the invention without departing from the spirit thereof or the scope of the appended claims.

What is claimed is:

1. In an implement adapted for attachment to a tractor and including earthworking units in tandem, said units comprising longitudinally spaced front and rear frames, earthworking tools mounted on said frames, hitch means on said front frame for connection thereof to the tractor, laterally spaced generally parallel links extending between and pivotally connected at their ends on transverse axes to said front and rear frames to accommodate translational movement of the rear unit vertically relative to the front unit and engageable with a portion of said front unit to limit the downward movement of said rear unit relative to said front unit, ground engaging wheels mounted on the front frame between said units, power operated means mounted on the front frame operatively connected to said wheels for vertically adjusting them to raise and lower said units, and means in the mounting of the wheels on the front frame accommodating upward movement of said front frame relative to the wheels, independently of said power operated means.

2. In an implement adapted for attachment to a tractor and including earthworking units in tandem, said units comprising longitudinally spaced front and rear frames, earthworking tools mounted on said frames, hitch means on said front frame for connection thereof to the tractor, laterally spaced generally parallel links extending between and pivotally connected at their ends on transverse axes to said front and rear frames to accommodate translational movement of the rear unit vertically relative to the front unit, an auxiliary frame pivotally mounted on the front frame for swinging in a vertical plane relative to the front frame, wheels mounted on said auxiliary frame for vertical movement relative thereto and to said front frame, and power operated means mounted on the auxiliary frame and operatively connected to said wheels to vertically adjust the latter independently of the pivoting of said auxiliary frame.

3. The invention set forth in claim 2, wherein said wheels are mounted on the auxiliary frame for vertical swinging about a pivot axis mounted on the auxiliary frame longitudinally spaced from the latter's pivot on the front frame.

4. In an implement adapted for connection to a tractor and having a tool-carrying frame, a pair of laterally spaced wheel-carrying arms pivotally mounted on the frame for vertical swinging relative thereto, a lever rockably mounted on the frame between said wheels, a transverse bar member resting upon said wheel arms and having means pivotally connecting it medially of its ends to said lever for pivoting about an axis, at said connecting means parallel to the planes of vertical swinging of said arms, and a hydraulic cylinder mounted on the frame and operatively connected to the lever to force the bar member and wheel arms downwardly relative to the frame to raise the latter, said bar member being pivotable about said axis to accommodate vertical movement of said wheel-carrying arms independently of each other and said cylinder in response to variations in ground contour.

5. The invention set forth in claim 4, wherein said wheel-carrying arms and said cylinder are mounted on an auxiliary frame which is pivoted on the tool-carrying frame on a transverse axis accommodating upward movement of the tool-carrying frame upon encountering an obstruction while maintaining the vertical position of the wheels substantially unimpaired.

6. The invention set forth in claim 4, wherein said tool-carrying frame is the front unit of an implement having a rear unit independently vertically movable relative to the front unit and connected thereto by laterally spaced generally parallel links the ends of which are pivotally connected to the respective of said units on transverse axes accommodating translational movement of the rear unit relative to the front unit.

7. The invention set forth in claim 6, wherein uprights are affixed to said units between said links and are pivotally connected to the ends of an upper link generally parallel to the previously mentioned links.

8. In an implement including longitudinally spaced front and rear units, hitch means on the front unit for connection thereof to a tractive vehicle and power operated means for vertically moving the units between operating and transport positions, laterally spaced generally parallel links pivotally connected at their ends to said units to accommodate relative translational vertical movement between the units, said power operated means comprising a transverse rockshaft mounted on the front unit, laterally spaced ground wheel-carrying arms pivotally mounted on the shaft, a lever affixed to the shaft between said arms, an equalizer bar having means medially of its ends connecting it to said lever for pivoting about an axis extending through the connecting means parallel to the planes of vertical swinging of said arms and having its ends resting upon said wheel arms, and a hydraulic cylinder mounted on the unit and connected to said lever to force the equalizer bar and said wheel arms downwardly, the pivotal mounting of said bar on said lever accommodating rocking of said bar in a vertical plane about the pivot of said bar on said lever and relative vertical movement of said wheels, independently of said hydraulic cylinder, in response to variations in ground contour.

9. The invention set forth in claim 8, wherein said laterally spaced links form the lower links of an assembly including uprights affixed to said front and rear units and an upper link generally parallel to said lower links and having its ends pivotally connected to said uprights.

References Cited by the Examiner
UNITED STATES PATENTS

| | | | |
|---|---|---|---|
| 2,612,825 | 10/52 | Walker | 172—449 X |
| 2,667,724 | 2/54 | Johnson et al. | 172—580 X |
| 2,938,589 | 5/60 | Silver | 172—580 X |
| 3,019,747 | 2/62 | Strahan | 172—315 X |

T. GRAHAM CRAVER, *Primary Examiner.*